United States Patent
Ts et al.

(10) Patent No.: US 11,210,182 B2
(45) Date of Patent: Dec. 28, 2021

(54) MULTIPLE FILE SYSTEM RECOVERY USING DYNAMIC WEB SERVER

(71) Applicant: EMC IP Holding Company LLC, Hopkinton, MA (US)

(72) Inventors: Sharath Ts, Bengaluru (IN); Narendra J. Gangadhar, Karnataka (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 509 days.

(21) Appl. No.: 16/248,488

(22) Filed: Jan. 15, 2019

(65) Prior Publication Data
US 2020/0226034 A1 Jul. 16, 2020

(51) Int. Cl.
*G06F 16/00* (2019.01)
*G06F 11/14* (2006.01)
*G06F 9/455* (2018.01)
*G06F 16/16* (2019.01)

(52) U.S. Cl.
CPC ...... *G06F 11/1469* (2013.01); *G06F 9/45558* (2013.01); *G06F 11/1464* (2013.01); *G06F 16/16* (2019.01); *G06F 2009/4557* (2013.01); *G06F 2009/45583* (2013.01); *G06F 2201/815* (2013.01)

(58) Field of Classification Search
USPC .................................................. 707/674–682
See application file for complete search history.

(56) References Cited

U.S. PATENT DOCUMENTS

| | | | |
|---|---|---|---|
| 10,204,019 B1* | 2/2019 | Talley | G06F 11/2294 |
| 2015/0317216 A1* | 11/2015 | Hsu | G06F 16/188 |
| | | | 707/679 |
| 2016/0055064 A1* | 2/2016 | Gostev | G06F 21/629 |
| | | | 726/4 |
| 2019/0108099 A1* | 4/2019 | Mazumdar | G06F 16/188 |
| 2019/0129804 A1* | 5/2019 | Liu | G06F 11/1469 |

* cited by examiner

*Primary Examiner* — Thu Nguyet T Le
(74) *Attorney, Agent, or Firm* — Womble Bond Dickinson (US) LLP

(57) ABSTRACT

A method, apparatus, and system for performing file system restoration to a plurality of recovery destination virtual machines is disclosed. The operations comprise: receiving file system recovery requests associated with a same recovery source virtual machine from a plurality of recovery destination virtual machines; spawning a helper virtual machine to facilitate the recovery; configuring the helper virtual machine to host a web server; rebuilding a file system of the source virtual machine at the helper virtual machine; generating a web address served by the web server and associated with files of the rebuilt file system; transmitting the web address from the helper virtual machine to each of the plurality of recovery destination virtual machines through a backup server; downloading, at each of the plurality of recovery destination virtual machines, files of the rebuilt file system from the helper virtual machine to complete the recovery; and deleting the helper virtual machine.

18 Claims, 4 Drawing Sheets

MULTIPLE FILE SYSTEM RECOVERY USING DYNAMIC WEB SERVER

FIELD OF THE INVENTION

Embodiments of the present invention relate generally to data storage systems. More particularly, embodiments of the invention relate to file system restoration to a plurality of recovery destination virtual machines.

BACKGROUND

In a conventional one to one file system recovery process, both the recovery source virtual machine (i.e., the backup) and the recovery destination virtual machine are added as clients at the backup server. The backup server then reads the files from the recovery source virtual machine and replicates (restores) the files to the recovery destination virtual machine. In an alternative conventional recover process, a user (e.g., an administrator) manually logs into the recovery destination virtual machine and executes a series of commands at the recovery destination virtual machine in order to perform the recovery. Neither conventional process is efficient when a one-to-many recovery is desired.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure are related to a method, apparatus, and system for performing file system restoration to a plurality of recovery destination virtual machines. The operations comprise: receiving file system recovery requests associated with a same recovery source virtual machine from a plurality of recovery destination virtual machines; spawning a helper virtual machine to facilitate the file system recovery; configuring the helper virtual machine to host a web server; rebuilding a file system of the recovery source virtual machine at the helper virtual machine; generating a web address served by the web server hosted at the helper virtual machine and associated with files of the rebuilt file system of the recovery source virtual machine; transmitting the web address from the helper virtual machine to each of the plurality of recovery destination virtual machines through a backup server; downloading, at each of the plurality of recovery destination virtual machines, files of the rebuilt file system from the helper virtual machine to complete the file system recovery; and deleting the helper virtual machine.

In one embodiment, the helper virtual machine is reachable by the plurality of recovery destination virtual machines and the backup server through a network.

In one embodiment, the helper virtual machine is assigned with a dynamic Internet Protocol (IP) address. In one embodiment, the helper virtual machine is configured with a static Internet Protocol (IP) address.

In one embodiment, configuring the helper virtual machine to host a web server comprises pushing a web server bundle to the helper virtual machine.

In one embodiment, the files of the rebuilt file system are downloaded from the helper virtual machine at each of the plurality of recovery destination virtual machines with a web browser.

Figure 1:
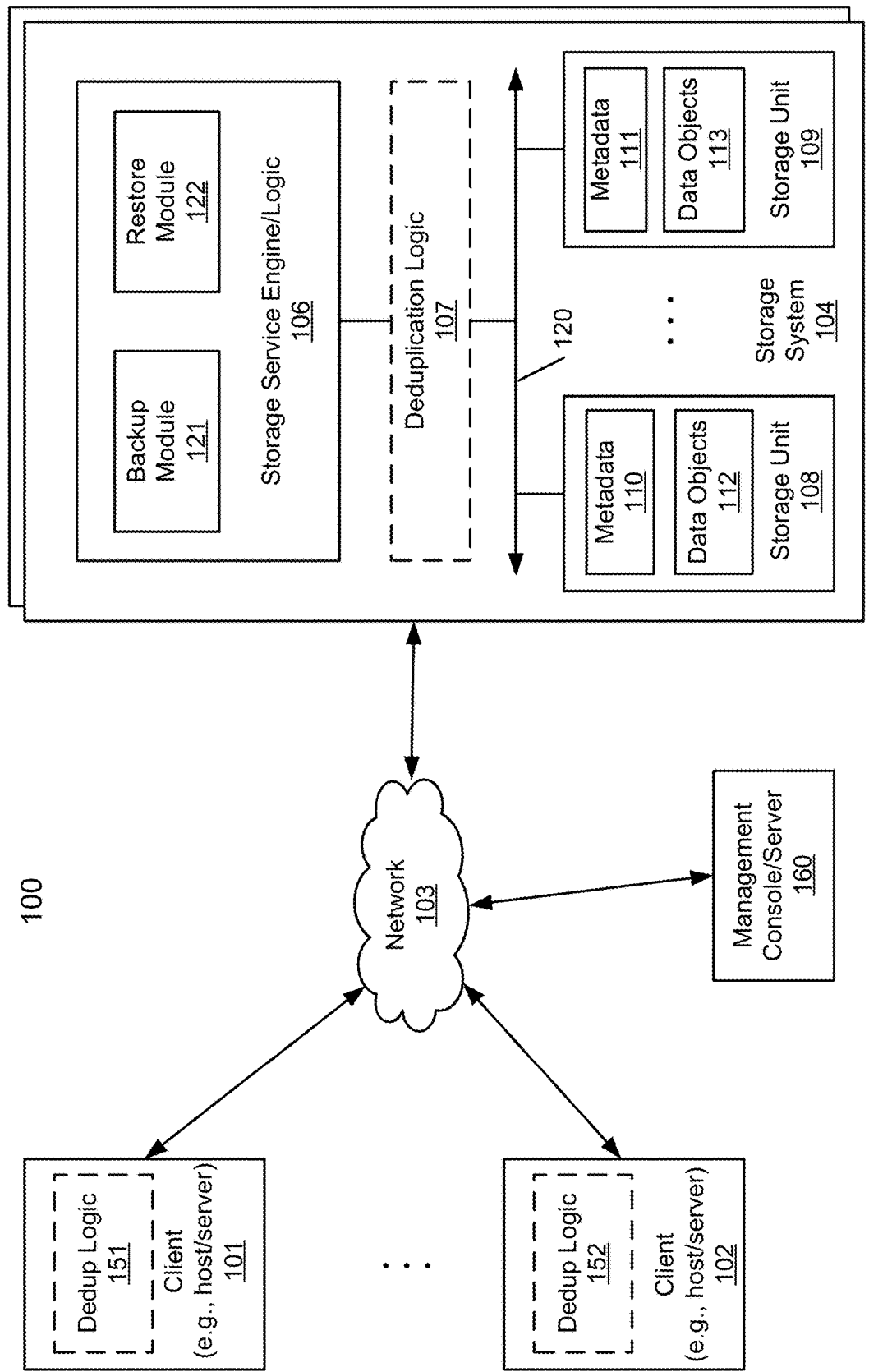
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Embodiments of the disclosure are related to a method, apparatus, and system that enables restoring files of a file system to multiple destinations in a single recovery session. Accordingly, time can be saved, and complexities of the operations reduced over the conventional one to one file system recovery process. Although references are made to virtual machines in the description herein of the embodiments of the disclosure, such references should be understood to include references to physical machine as well, where appropriate.

In a conventional one to one file system recovery process, both the recovery source virtual machine (i.e., the backup) and the recovery destination virtual machine are added as clients at the backup server. It should be appreciated that a backup client agent (e.g., software such as Dell® EMC NetWorker) needs to be installed at both the source and the destination virtual machines for the process to work. The backup server then reads the files from the recovery source virtual machine and replicates (restores) the files to the recovery destination virtual machine. In an alternative conventional recover process, a user (e.g., an administrator) manually logs into the recovery destination virtual machine and executes a series commands at the recovery destination virtual machine in order to perform the recovery. Neither conventional process is efficient when a one-to-many recovery is desired.

In one embodiment, a helper virtual machine that hosts a web server is utilized to facilitate a one-to-many file system recovery process. If desired, the method may also be utilized even when there is only one recovery destination virtual machine.

Figure 2:
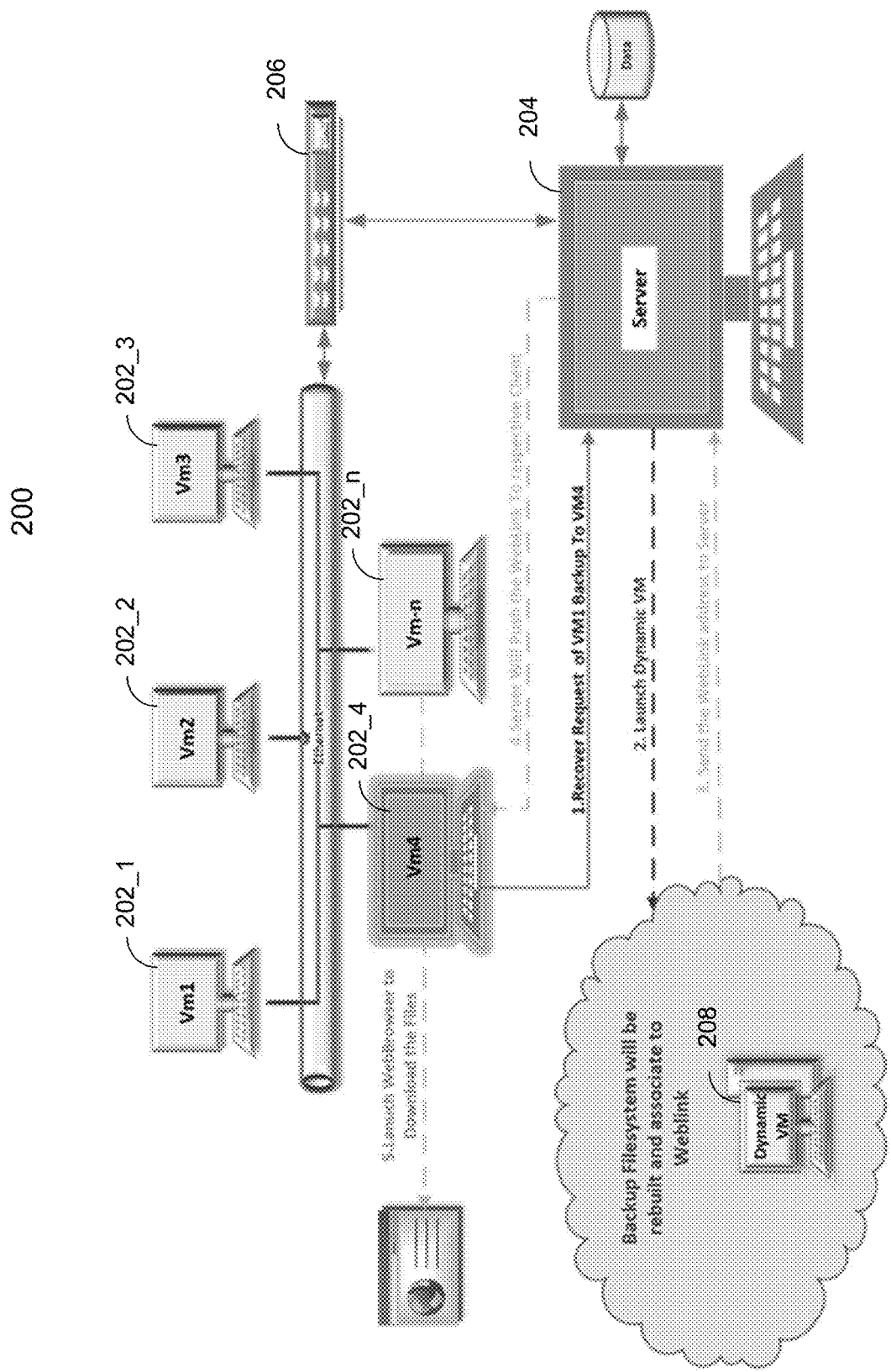
FIG. 2 is a diagram illustrating an example environment where embodiments may be practiced.

Referring to FIG. 2, a diagram illustrating an example environment 200 where embodiments may be practiced is shown. Virtual machines 1 through n 202_1-202_n and a backup server 204 are able to communicate with each other over a network 206. The backup server 204 is configured to coordinate the data backup and recovery operations in the environment 200. In one embodiment, the virtual machine 4 202_4 may transmit a message to the backup server 204, the message indicating that a file system recovery from the virtual machine 1 202_1 is requested by the virtual machine 4 202_4 (in other words, the virtual machine 1 202_1 is the recovery source virtual machine, and the virtual machine 4 202_4 is the recover destination virtual machine). In response to the message from the virtual machine 4 202_4, the backup server 204 may launch (spawn) a dynamic helper virtual machine 208. In particular, the backup server 204 may configure the helper virtual machine 208 to host a web server reachable through the network 206. The helper virtual machine 208 is further configured to rebuild locally the file system of the virtual machine 1 202_1 and generate a web address associated with the file system of the virtual machine 1 202_1. The helper virtual machine 208 then transmits the web address to the backup server 204, which passes the web address onto the virtual machine 4 202_4 (i.e., the recovery destination virtual machine). Upon receiving the web address, the virtual machine 4 202_4 may download the files of the file system of the virtual machine 1 202_1 from the helper virtual machine 208 over the network 206 based on the web address (e.g., by utilizing a web browser) and complete the recovery. If file system restoration to additional virtual machines is desired, the backup server 204 may similarly forward the web address to the additional recovery destination virtual machines. Each of the destination virtual machines may then download the files from the helper virtual machine 208 over the network 206 based on the web address to complete the recovery process.

Figure 3:
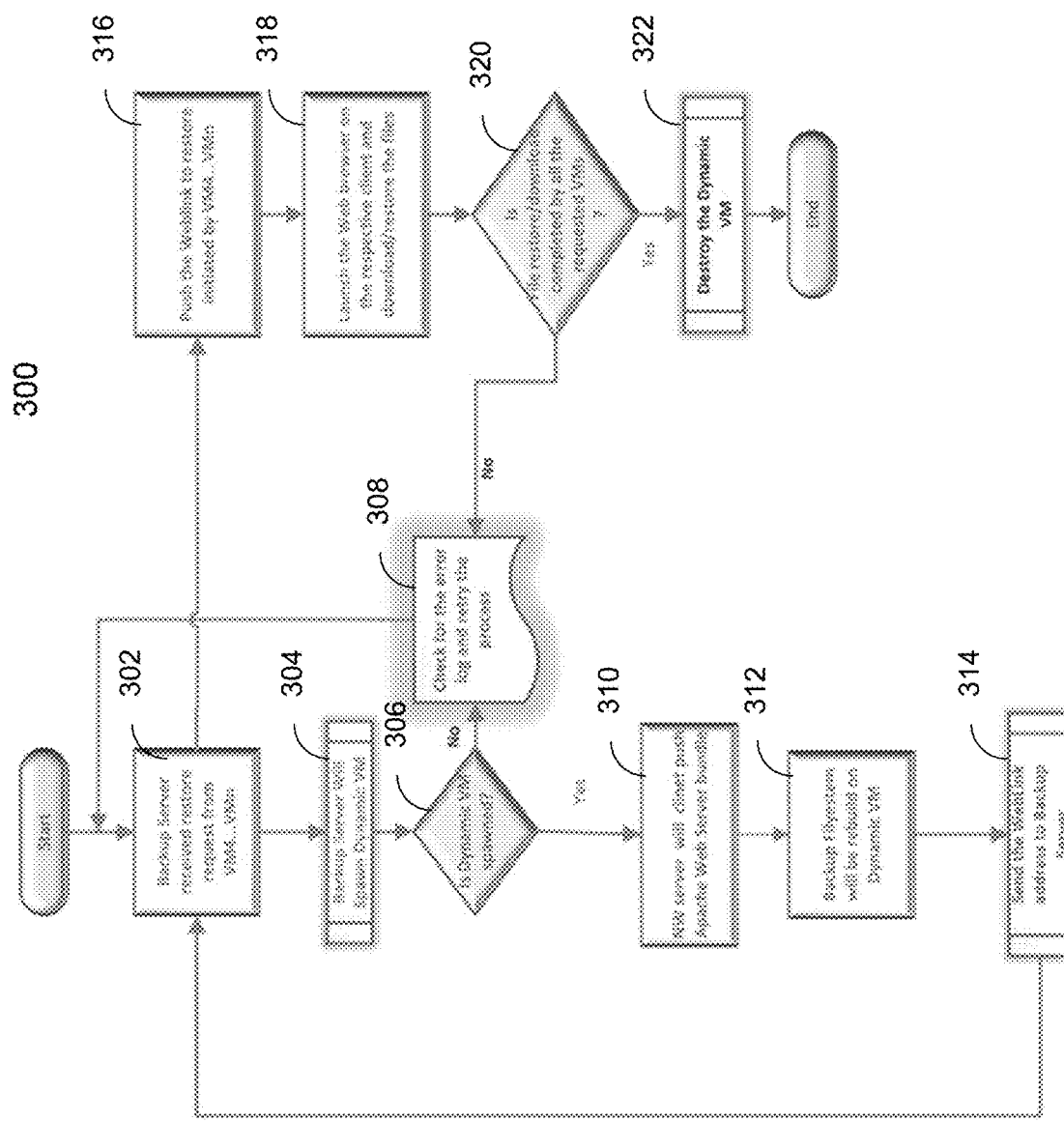
FIG. 3 is a flowchart illustrating an example method for performing file system restoration to multiple recovery destination virtual machines according to one embodiment.

Referring to FIG. 3, a flowchart illustrating an example method 300 for performing file system restoration to multiple recovery destination virtual machines according to one embodiment is shown. Process 300 may be performed by processing logic that includes hardware (e.g. circuitry, dedicated logic, etc.), software (e.g., embodied on a non-transitory computer readable medium), or a combination thereof. For example, process 300 may be performed by processor(s) 1501 of FIG. 4. Referring to FIG. 3, at block 302, the backup server may receive file system recovery requests from a plurality of recovery destination virtual machines. The file system recovery requests may be associated with a same recovery source virtual machine. At block 304, the backup server may (in response to a user/administrator input in some embodiments) spawn a helper virtual machine. The helper virtual machine may be dynamically assigned with an Internet Protocol (IP) address (e.g., with a Dynamic Host Configuration Protocol "DHCP" service), or may be configured with a static IP address. At block 306, whether the dynamic helper virtual machine has been successfully spawned is determined. A successfully spawned helper virtual machine should be reachable over the network by the backup server and the recovery destination backup machines. If not, at block 308, the error log may be checked to determine the exact error, and the process may be retried. If the helper virtual machine has been successfully spawned, at block 310, the backup server may configure the helper virtual machine to execute a web service and host a web server. In one embodiment, the backup server may configure the helper virtual machine by pushing a web server bundle (e.g., an Apache web server bundle) to the helper virtual machine with a client push functionality. It should be appreciated that with the currently available technology, the helper virtual machine may be spawned and configured within a relatively short period of time (e.g., no more than 15 seconds). At block 312, the recovery source (i.e., the backup) file system may be rebuilt at the helper virtual machine. Rebuilding the file system may comprise copying the recovery source file system from the recovery source virtual machine to the helper virtual machine over the network. The rebuilt file system may be exposed on the network through the web server. Thus, a web address served by the web server hosted at the helper virtual machine and associated with the files of the recovery source file system may be generated.

At block 314, the web address may be transmitted to the backup server. At block 316, the backup server may pass the web address to each of the recovery destination virtual machines where a file system recovery has been requested. At block 318, each of the recovery destination virtual machines (in response to a user/administrator command in some embodiments) may download the files of the file system from the helper virtual machine based on the web address (e.g., with a web browser, etc.) and complete the restoration. At block 320, whether the file system recovery has been completed at all the recovery destination virtual machines is determined. If not, the error log may be checked to determine the exact error, and the process may be retried. If the file system recovery has been completed at all the recovery destination virtual machines, at block 322, the backup server may stop and despawn (delete) the helper virtual machine.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
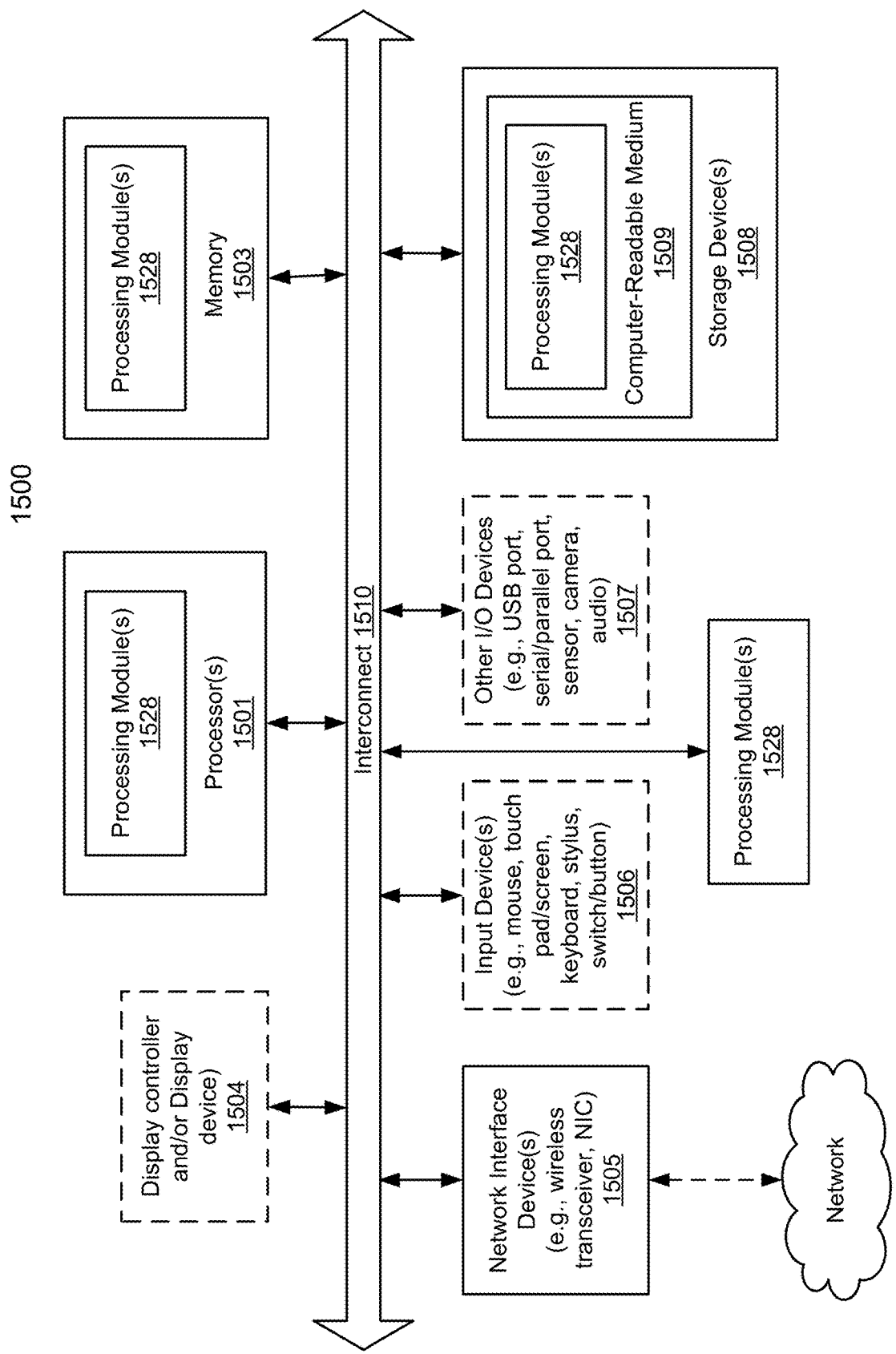
FIG. 4 is a block diagram illustrating a data processing system according to one embodiment.

FIG. 4 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Therefore, embodiments of the disclosure relate to utilizing a helper virtual machine that hosts a web server to facilitate a one-to-many file system recovery process. Compared to the conventional implementation, the innovative embodiments described herein are associated with time savings and reduced complexity.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
  receiving file system recovery requests associated with a recovery source virtual machine from a plurality of recovery destination virtual machines;
  spawning a helper virtual machine to facilitate a file system recovery;
  configuring the helper virtual machine to host a web server;
  rebuilding a file system of the recovery source virtual machine at the helper virtual machine;
  generating a web address served by the web server hosted at the helper virtual machine and associated with files of the rebuilt file system of the recovery source virtual machine;
  transmitting the web address from the helper virtual machine to each of the plurality of recovery destination virtual machines through a backup server;
  downloading, at each of the plurality of recovery destination virtual machines, files of the rebuilt file system from the helper virtual machine to complete the file system recovery; and
  deleting the helper virtual machine.

2. The method of claim 1, wherein the helper virtual machine is reachable by the plurality of recovery destination virtual machines and the backup server through a network.

3. The method of claim 1, wherein the helper virtual machine is assigned with a dynamic Internet Protocol (IP) address.

4. The method of claim 1, wherein the helper virtual machine is configured with a static Internet Protocol (IP) address.

5. The method of claim 1, wherein configuring the helper virtual machine to host a web server comprises pushing a web server bundle to the helper virtual machine.

6. The method of claim 1, wherein the files of the rebuilt file system are downloaded from the helper virtual machine to each of the plurality of recovery destination virtual machines with a web browser.

7. A non-transitory machine-readable medium having instructions stored therein, which when executed by a processor, cause the processor to perform data recovery operations, the operations comprising:
receiving file system recovery requests associated with a recovery source virtual machine from a plurality of recovery destination virtual machines;
spawning a helper virtual machine to facilitate a file system recovery;
configuring the helper virtual machine to host a web server;
rebuilding a file system of the recovery source virtual machine at the helper virtual machine;
generating a web address served by the web server hosted at the helper virtual machine and associated with files of the rebuilt file system of the recovery source virtual machine;
transmitting the web address from the helper virtual machine to each of the plurality of recovery destination virtual machines through a backup server;
downloading, at each of the plurality of recovery destination virtual machines, files of the rebuilt file system from the helper virtual machine to complete the file system recovery; and
deleting the helper virtual machine.

8. The non-transitory machine-readable medium of claim 7, wherein the helper virtual machine is reachable by the plurality of recovery destination virtual machines and the backup server through a network.

9. The non-transitory machine-readable medium of claim 7, wherein the helper virtual machine is assigned with a dynamic Internet Protocol (IP) address.

10. The non-transitory machine-readable medium of claim 7, wherein the helper virtual machine is configured with a static Internet Protocol (IP) address.

11. The non-transitory machine-readable medium of claim 7, wherein configuring the helper virtual machine to host a web server comprises pushing a web server bundle to the helper virtual machine.

12. The non-transitory machine-readable medium of claim 7, wherein the files of the rebuilt file system are downloaded from the helper virtual machine to each of the plurality of recovery destination virtual machines with a web browser.

13. A data processing system, comprising:
a processor; and
a memory coupled to the processor to store instructions, which when executed by the processor, cause the processor to perform data recovery operations, the operations including:
receiving file system recovery requests associated with a recovery source virtual machine from a plurality of recovery destination virtual machines;
spawning a helper virtual machine to facilitate a file system recovery;
configuring the helper virtual machine to host a web server;
rebuilding a file system of the recovery source virtual machine at the helper virtual machine;
generating a web address served by the web server hosted at the helper virtual machine and associated with files of the rebuilt file system of the recovery source virtual machine;
transmitting the web address from the helper virtual machine to each of the plurality of recovery destination virtual machines through a backup server;
downloading, at each of the plurality of recovery destination virtual machines, files of the rebuilt file system from the helper virtual machine to complete the file system recovery; and
deleting the helper virtual machine.

14. The data processing system of claim 13, wherein the helper virtual machine is reachable by the plurality of recovery destination virtual machines and the backup server through a network.

15. The data processing system of claim 13, wherein the helper virtual machine is assigned with a dynamic Internet Protocol (IP) address.

16. The data processing system of claim 13, wherein the helper virtual machine is configured with a static Internet Protocol (IP) address.

17. The data processing system of claim 13, wherein configuring the helper virtual machine to host a web server comprises pushing a web server bundle to the helper virtual machine.

18. The data processing system of claim 13, wherein the files of the rebuilt file system are downloaded from the helper virtual machine to each of the plurality of recovery destination virtual machines with a web browser.

* * * * *